United States Patent
Schuster et al.

(10) Patent No.: US 10,860,598 B2
(45) Date of Patent: Dec. 8, 2020

(54) SYSTEMS AND METHODS FOR INTEREST-DRIVEN BUSINESS INTELLIGENCE SYSTEMS INCLUDING EVENT-ORIENTED DATA

(71) Applicant: Workday, Inc., Pleasanton, CA (US)

(72) Inventors: John Schuster, Los Altos Hills, CA (US); Benjamin Mark Werther, Burlingame, CA (US); Brian F. Babcock, Palo Alto, CA (US); Kevin Scott Beyer, San Francisco, CA (US); Hans-Frederick Brown, San Rafael, CA (US)

(73) Assignee: Workday, Inc., Pleasanton, CA (US)

( * ) Notice: Subject to any disclaimer, the term of this patent is extended or adjusted under 35 U.S.C. 154(b) by 338 days.

(21) Appl. No.: 15/853,528

(22) Filed: Dec. 22, 2017

(65) Prior Publication Data

US 2018/0210934 A1   Jul. 26, 2018

Related U.S. Application Data

(63) Continuation of application No. 14/198,039, filed on Mar. 5, 2014, now Pat. No. 9,892,178.
(Continued)

(51) Int. Cl.
*G06F 16/00* (2019.01)
*G06F 16/25* (2019.01)
(Continued)

(52) U.S. Cl.
CPC ........ *G06F 16/254* (2019.01); *G06F 16/2477* (2019.01); *G06F 16/283* (2019.01); *G06F 16/29* (2019.01)

(58) Field of Classification Search
CPC .. G06F 16/2477; G06F 16/254; G06F 16/283; G06F 16/29; G06F 16/24568; G06F 16/951
(Continued)

(56) References Cited

U.S. PATENT DOCUMENTS

| | | | |
|---|---|---|---|
| 6,112,197 | A | 8/2000 | Chatterjee |
| 6,349,138 | B1 | 2/2002 | Doshi |

(Continued)

FOREIGN PATENT DOCUMENTS

| | | |
|---|---|---|
| EP | 2040180 | 3/2009 |
| WO | WO-2007072501 | 6/2007 |

(Continued)

OTHER PUBLICATIONS

Borthakur et al., 'Apache Hadoop Goes Realtime at Facebook', SIGMOD '11 Proceedings of the 2011 ACM SIGMOD International Conference on Management of data, 1071-1080.
(Continued)

*Primary Examiner* — Vincent F Boccio
(74) *Attorney, Agent, or Firm* — Van Pelt, Yi & James LLP

(57) ABSTRACT

Systems and methods for interest-driven business intelligence systems including event-oriented data in accordance with embodiments of the invention are illustrated. In one embodiment, an interest-driven business intelligence system includes raw data storage configured to contain raw data and perform ETL processes, a data mart configured to contain metadata that describes the raw data, and an intermediate processing layer, wherein the intermediate processing layer is configured to compile an interest-driven data pipeline configured to generate ETL processing jobs to generate event-oriented data from the raw data by filtering the raw data based on the metadata describing the raw data, deter-
(Continued)

mining ordering data based on the metadata describing the raw data, aligning the filtered raw data based on the ordering data, and generating event-oriented data based on the aligned filtered raw data, and storing the event-oriented data in the data mart.

22 Claims, 10 Drawing Sheets

Related U.S. Application Data

(60) Provisional application No. 61/894,186, filed on Oct. 22, 2013, provisional application No. 61/880,051, filed on Sep. 19, 2013.

(51) Int. Cl.
  *G06F 16/29* (2019.01)
  *G06F 16/28* (2019.01)
  *G06F 16/2458* (2019.01)

(58) Field of Classification Search
  USPC .......................................................... 707/602
  See application file for complete search history.

(56) References Cited

U.S. PATENT DOCUMENTS

| | | |
|---|---|---|
| 7,151,438 B1 | 12/2006 | Hall |
| 7,168,953 B1 | 1/2007 | Poggio |
| 7,174,342 B1 | 2/2007 | Scheurich |
| 7,209,923 B1 | 4/2007 | Cooper |
| 7,272,660 B1 | 9/2007 | Powers |
| 7,275,053 B1 | 9/2007 | Gardner |
| 7,293,031 B1 | 11/2007 | Dusker |
| 7,299,216 B1 | 11/2007 | Liang |
| 7,315,849 B2 | 1/2008 | Bakalash |
| 7,412,481 B2 | 8/2008 | Nicholls |
| 7,430,562 B1 | 9/2008 | Bedell |
| 7,702,615 B1 | 4/2010 | Delurgio |
| 7,945,852 B1 | 5/2011 | Pilskalns |
| 8,032,485 B2 | 10/2011 | Alvarez |
| 8,156,101 B2 | 4/2012 | Indeck |
| 8,260,840 B1 | 9/2012 | Sirota |
| 8,261,193 B1 | 9/2012 | Alur |
| 8,266,148 B2 | 9/2012 | Guha |
| 8,447,721 B2 | 5/2013 | Eshleman |
| 2003/0030733 A1 | 2/2003 | Seaman |
| 2003/0101454 A1 | 5/2003 | Ozer |
| 2003/0229652 A1 | 12/2003 | Bakalash |
| 2004/0059701 A1 | 3/2004 | Fedorov |
| 2004/0138935 A1 | 7/2004 | Johnson |
| 2004/0164961 A1 | 8/2004 | Bal |
| 2005/0187974 A1 | 8/2005 | Gong |
| 2006/0064667 A1 | 3/2006 | Freitas |
| 2006/0100912 A1 | 5/2006 | Kumar |
| 2006/0112123 A1 | 5/2006 | Clark |
| 2006/0242604 A1 | 10/2006 | Wong |
| 2007/0021992 A1 | 1/2007 | Konakalla |
| 2007/0078960 A1 | 4/2007 | Dawson |
| 2007/0136683 A1 | 6/2007 | Heidari |
| 2007/0156718 A1 | 7/2007 | Hossfeld |
| 2007/0239769 A1 | 10/2007 | Fazal |
| 2007/0294126 A1 | 12/2007 | Maggio |
| 2008/0046930 A1 | 2/2008 | Smith |
| 2008/0109235 A1 | 5/2008 | Binnie |
| 2008/0253306 A1 | 10/2008 | Manion |
| 2008/0294996 A1 | 11/2008 | Hunt |
| 2008/0313345 A1 | 12/2008 | Bernardin |
| 2009/0083306 A1 | 3/2009 | Sichi |
| 2009/0248631 A1 | 10/2009 | Alba |
| 2009/0319544 A1 | 12/2009 | Griffin |
| 2009/0319546 A1 | 12/2009 | Shaik |
| 2010/0100952 A1 | 4/2010 | Sample |
| 2010/0251100 A1 | 9/2010 | Delacourt |
| 2010/0287146 A1 | 11/2010 | Skelton |
| 2011/0004830 A1 | 1/2011 | Von Kaenel |
| 2011/0047525 A1 | 2/2011 | Castellanos |
| 2011/0060905 A1 | 3/2011 | Stack |
| 2011/0137850 A1 | 6/2011 | Mourey |
| 2011/0145287 A1 | 6/2011 | Jiang |
| 2011/0282690 A1 | 11/2011 | Patel |
| 2011/0295794 A1 | 12/2011 | Venkatasubramanian |
| 2011/0295795 A1 | 12/2011 | Venkatasubramanian |
| 2011/0313969 A1 | 12/2011 | Ramu |
| 2012/0078951 A1 | 3/2012 | Hsu |
| 2012/0109879 A1 | 5/2012 | Devadoss |
| 2012/0130987 A1 | 5/2012 | Bose |
| 2012/0144243 A1 | 6/2012 | Carey |
| 2012/0150791 A1 | 6/2012 | Willson |
| 2012/0169713 A1 | 7/2012 | Gao |
| 2012/0179742 A1 | 7/2012 | Acharya |
| 2012/0239609 A1 | 9/2012 | Zhao |
| 2012/0265726 A1 | 10/2012 | Padmanabhan |
| 2012/0324387 A1 | 12/2012 | Rausch |
| 2013/0013552 A1 | 1/2013 | Eshleman |
| 2013/0018671 A1 | 1/2013 | Hussam |
| 2013/0086104 A1 | 4/2013 | Morrison |
| 2013/0103677 A1 | 4/2013 | Chakra |
| 2013/0132163 A1 | 5/2013 | Eder |
| 2013/0136416 A1 | 5/2013 | Sathish |
| 2013/0226860 A1 | 8/2013 | Eshleman |
| 2013/0238551 A1 | 9/2013 | Eshleman |
| 2014/0019352 A1 | 1/2014 | Shrivastava |
| 2014/0114909 A1 | 4/2014 | Schuster |
| 2014/0114970 A1 | 4/2014 | Prabu |
| 2014/0149405 A1 | 5/2014 | Dawson |
| 2014/0258209 A1 | 9/2014 | Eshleman |
| 2014/0351233 A1* | 11/2014 | Crupi ................ G06F 16/24568 707/706 |
| 2015/0081353 A1 | 3/2015 | Schuster |
| 2015/0081619 A1 | 3/2015 | Brown |
| 2015/0112969 A1 | 4/2015 | Prabhu |
| 2016/0162521 A1 | 6/2016 | Pradhan |

FOREIGN PATENT DOCUMENTS

| | | |
|---|---|---|
| WO | WO-2008092149 | 7/2008 |
| WO | WO-2013130870 | 9/2013 |
| WO | WO-2014066051 | 5/2014 |
| WO | WO-2014066052 | 5/2014 |
| WO | WO-2014137413 | 9/2014 |
| WO | WO-2015041714 | 3/2015 |
| WO | WO-2015041731 | 3/2015 |
| WO | WO-2015041735 | 3/2015 |
| WO | WO-2015060892 | 4/2015 |
| WO | WO-2015060893 | 4/2015 |

OTHER PUBLICATIONS

Cohen, Jeffrey et al., 'MAD Skills: New Analysis Practices for Big Data', Proceedings of the VLDB Endowment, vol. 2 Issue 2, Aug. 2009, 1481-1492.

Condie, Tyson et al., 'MapReduce Online', NSDI. vol. 10. No. 4. 2010. Available online at http://www.eecs.berkeley.edu/Pubs/TechRpts/2009/EECS-2009-136.html, 1-15.

Extended European Search Report for European Application EP13754225.4,Report Completed May 4, 2015, dated May 13, 2015, 4 Pgs.

International Preliminary Report on Patentability for International Application PCT/US2013/028402, report completed Apr. 23, 2013, dated Sep. 12, 2014, 6 Pgs., Sep. 12, 2014.

International Preliminary Report on Patentability for International Application PCT/US2013/064271, Report dated Apr. 28, 2015, Mailed May 7, 2015, 9 Pgs.

International Preliminary Report on Patentability for International Application PCT/US2013/064272, Report dated Apr. 28, 2015, Mailed May 7, 2015, 5 Pgs.

International Preliminary Report on Patentability for International Application PCT/US2013/067815, Report dated Sep. 8, 2015, Mailed Sep. 17, 2015, 9 Pgs.

(56) References Cited

OTHER PUBLICATIONS

International Preliminary Report on Patentability for International Application PCT/US2014/022060, Report dated Mar. 22, 2016, Mailed Mar. 31, 2016, 8 Pgs.
International Preliminary Report on Patentability for International Application PCT/US2014/029149, Report dated Apr. 26, 2016, Mailed May 6, 2016, 9 Pgs.
International Preliminary Report on Patentability for International Application PCT/US2014/029191, Report dated Apr. 26, 2016, Mailed May 6, 2016, 9 Pgs.
International Preliminary Report on Patentability for International Application PCT/US2014/042488, Report dated Mar. 22, 2016, Mailed Mar. 31, 2016, 8 Pgs.
International Preliminary Report on Patentability for International Application PCT/US2014/044050, Report dated Mar. 22, 2016, Mailed Mar. 31, 2016, 6 Pgs.
International Search Report and Written Opinion for International Application PCT/US13/64271, report completed Mar. 26, 2014, dated Apr. 18, 2014, 10 Pgs.
International Search Report and Written Opinion for International Application PCT/US13/64272, report completed Mar. 28, 2014, dated Apr. 21, 2014, 6 Pgs.
International Search Report and Written Opinion for International Application PCT/US14/22060, report completed Jun. 23, 2014 dated Jul. 21, 2014, 9 Pgs.
International Search Report and Written Opinion for International Application PCT/US14/29149, report completed Jul. 22, 2014, dated Aug. 25, 2014, 9 Pages.
International Search Report and Written Opinion for International Application PCT/US14/29191, report completed Jun. 30, 2014, dated Aug. 15, 2014, 9 Pages.
International Search Report and Written Opinion for International Application PCT/US14/42488, report completed Sep. 25, 2014, dated Oct. 30, 2014, 9 Pgs., Oct. 30, 2014.
International Search Report and Written Opinion for International Application PCT/US14/44050, report completed Oct. 3, 2014, dated Oct. 15, 2014, 7 Pgs., Oct. 15, 2014.
International Search Report and Written Opinion for International Application PCT/US2013/028402, completed Apr. 22, 2013, 7 pgs.
International Search Report and Written Opinion for International Application PCT/US2013/067815, completed Apr. 14, 2014, 11 pgs.
International Search Report and Written Opinion for International Application PCT/US2014/027875, report completed Jul. 15, 2014, dated Aug. 19, 2014, 9 Pages.
Karabegovic, Almir et al., 'Geoportal as Decision Support System with Spatial Data Warehouse', [online] published 2012. [retrieved on Oct. 3, 2014 (Mar. 10, 2014)] Retrieved from the Internet<URL: https://fedcsis.org/proceedings/2012/pliks/111.pdf> entire document, 2012, 4 Pages.
Kossmann, Donald , 'The State of the Art in Distributed Query Processing', ACM Computing Surveys, vol. 32 Issue 4, Dec. 2000, Dec. 2000, 422-469.
Metwally, Ahmed et al., "Efficient computation of frequent and top-k elements in data streams." International Conference on Database Theory. Springer, Berlin, Heidelberg, 2005.
Morfonios, Konstantinos et al., 'ROLAP Implementations of the Data Cube', ACM Computing Surveys, vol. 39, No. 4, Article 12, 2007, Oct. 2007, 12:1-12:53.
Nandi, Arnab et al., 'Guided Interaction: Rethinking the Query-Result Paradigm', Proceedings of the VLDB Endowment, vol. 4, No. 12, Aug. 2011, 1466-1469.
Shvachko et al., 'The Hadoop Distributed File System', 2010 IEEE 26th Symposium on Mass Storage Systems and Technologies (MSST), 1-10.

\* cited by examiner

SYSTEMS AND METHODS FOR INTEREST-DRIVEN BUSINESS INTELLIGENCE SYSTEMS INCLUDING EVENT-ORIENTED DATA

CROSS-REFERENCE TO RELATED APPLICATIONS

The current application is a continuation of co-pending U.S. patent application Ser. No. 14/198,039, filed Mar. 5, 2014, which claims priority to U.S. Provisional Patent Application Ser. No. 61/894,186, filed Oct. 22, 2013, and to U.S. Provisional Patent Application Ser. No. 61/880,051, filed Sep. 19, 2013, the disclosures of which are hereby incorporated by reference in their entirety.

BACKGROUND

The term "business intelligence" is commonly used to refer to techniques for identifying, processing, and analyzing business data. Business intelligence systems can provide historical, current, and predictive views of business operations. Business data, generated during the course of business operations, including data generated from business processes and the additional data created by employees and customers, may be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and/or utilize a data warehouse.

Data warehouses are utilized to store, analyze, and report data such as business data. Data warehouses utilize databases to store, analyze, and harness the data in a productive and cost-effective manner. A variety of databases are commonly utilized including a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI tools are created by database administrators and/or business intelligence specialists, and the underlying database may be tuned for the expected access patterns. A database administrator may index, pre-aggregate or restrict access to specific relations, allow ad-hoc reporting and exploration.

A snowflake schema is an arrangement of tables in a RDBMS, with a central fact table connected to one or more dimension tables. The dimension tables in a snowflake schema are normalized into multiple related tables—for a complex schema there will be many relationships between the dimension tables, resulting in a schema that looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Online transaction processing (OLTP) systems designed to facilitate and manage transaction-based applications. OTLP may refer to a variety of transactions such a database management system transactions, business, or commercial transactions. OLTP systems typically have low latency response to user requests.

Online analytical processing (OLAP) is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for many OLAP systems is an OLAP cube. An OLAP cube is a data structure allowing for fast analysis of data with the capability of manipulating and analyzing data from multiple perspectives. OLAP cubes are typically composed of numeric facts, called measures, categorized by dimensions. These facts and measures are commonly created from a star schema or a snowflake schema of tables in a RDBMS.

SUMMARY OF THE INVENTION

Systems and methods for interest-driven business intelligence systems including event-oriented data in accordance with embodiments of the invention are illustrated. In one embodiment, an interest-driven business intelligence system includes raw data storage configured to contain raw data and perform extract, transform, and load (ETL) processes, a data mart configured to contain metadata that describes the raw data, and an intermediate processing layer, wherein the intermediate processing layer is configured to automatically generate metadata describing the raw data, derive reporting data requirements from at least one report specification based on the metadata, and compile an interest-driven data pipeline based upon the reporting data requirements, where compiling the interest-driven data pipeline includes generating ETL processing jobs to generate event-oriented data from the raw data by filtering the raw data based on the metadata describing the raw data, determining ordering data based on the metadata describing the raw data, aligning the filtered raw data based on the ordering data, generating event-oriented data based on the aligned filtered raw data, and storing the event-oriented data in the data mart, generating reporting data including data satisfying the reporting data requirements based on the event-oriented data, and storing the reporting data in the data mart for exploration by an interest-driven data visualization system.

In another embodiment of the invention, the raw data includes unstructured data.

In an additional embodiment of the invention, the raw data storage is a data warehouse.

In yet another additional embodiment of the invention, the data warehouse is implemented utilizing a system selected from the group consisting of a distributed computing system, a database management system, and a NoSQL database.

In still another additional embodiment of the invention, the data warehouse is a distributed computing system implemented utilizing Hadoop.

In yet still another additional embodiment of the invention, the data warehouse is configured to store data generated utilizing the intermediate processing layer.

In yet another embodiment of the invention, the intermediate processing layer is configured to generate data warehouse requests.

In still another embodiment of the invention, the data warehouse requests include MapReduce operations.

In yet still another embodiment of the invention, the intermediate processing layer is implemented utilizing a system selected from the group consisting of a distributed computing system, a database management system, and a NoSQL database system.

In yet another additional embodiment of the invention, an interest-driven data visualization system, wherein the interest-driven data visualization system is configured to receive metadata describing the raw data from the intermediate processing layer and generate a user interface enabling user exploration of the metadata to define at least one report specification, where the user exploration involves selection of additional reporting data based on the metadata.

In still another additional embodiment of the invention, the interest-driven data visualization system is configured to display an indication based upon the interactive exploration of the at least one report.

In yet still another additional embodiment of the invention, the data mart is further configured to contain aggregate data, where aggregate data includes structured data generated using ETL processes from the raw data.

In yet another embodiment of the invention, compiling the interest-driven pipeline further includes generating ETL processing jobs to generate aggregate data from the raw data by filtering the raw data based on the metadata describing the raw data, applying transformations to the raw data based on the metadata describing the raw data, generating aggregate data based on the transformed data, and storing the aggregate data in the data mart.

In still another embodiment of the invention, compiling the interest-driven pipeline further includes generating ETL processing jobs to generate aggregate data from event-oriented data by identifying at least one dimension within a piece of event-oriented data, obtaining raw data corresponding to the identified at least one dimension, applying transformations to the obtained raw data based on the metadata describing the obtained raw data, generating aggregate data based on the transformed data, and storing the aggregate data in the data mart.

In yet still another embodiment of the invention, compiling the interest-driven pipeline further includes generating ETL processing jobs to generate event-oriented data from aggregate data by identifying at least one dimension within a piece of aggregate data, obtaining raw data corresponding to the identified at least one dimension, filtering the obtained raw data based on the metadata describing the obtained raw data, determining ordering data based on the metadata describing the obtained raw data, aligning the filtered obtained raw data based on the ordering data, generating event-oriented data based on the aligned data, and storing the event-oriented data in the data mart.

In yet another additional embodiment of the invention, the data mart is contained within the intermediate processing layer.

In still another additional embodiment of the invention, the ordering data includes at least one dimension identified in the metadata describing the raw data.

In yet still another additional embodiment of the invention, aligning the filtered raw data based on the ordering data includes sorting the event-oriented data according to the facts associated with the ordering data in each piece of event-oriented data.

In yet another embodiment of the invention, aligning the filtered raw data based on the ordering data further includes mapping at least two dimensions within the filtered raw data to a common set of data and the common set of data is based on the ordering data.

In still another embodiment of the invention, the ordering data includes time data.

Yet another embodiment of the invention includes a method for creating a report utilizing an interest-driven business intelligence system, including storing raw data in raw data storage using an interest-driven business intelligence system, where the raw data includes unstructured data, generating metadata describing the raw data using the interest-driven business intelligence system, receiving report definitions generated utilizing the metadata describing the raw data using the interest-driven business intelligence system, automatically generating reporting data requirements derived from report definitions using the interest-driven business intelligence system, automatically compiling an interest-driven data pipeline that is part of the interest-driven business intelligence system using the reporting data requirements and the raw data, obtaining event-oriented data from the interest-driven data pipeline based on the generated reporting data requirements using the interest-driven business intelligence system, where the event-oriented data includes a set of dimensions and the event-oriented data is ordered based on at least one dimension in the set of dimensions, generating reporting data from the reporting data requirements using the interest-driven data pipeline, where the reporting data is based on a portion of the event-oriented data, and storing the generated reporting data in a data mart within the interest-driven business intelligence system.

In still another additional embodiment of the invention, compiling the interest-driven pipeline further includes generating ETL processing jobs to generate aggregate data from event-oriented data by identifying at least one dimension within a piece of event-oriented data using the interest-driven business intelligence system, obtaining raw data corresponding to the identified at least one dimension using the interest-driven business intelligence system, applying transformations to the obtained raw data based on the metadata describing the obtained raw data to generate aggregate data using the interest-driven business intelligence system, and storing the aggregate data using the interest-driven business intelligence system.

In yet still another additional embodiment of the invention, generating ETL processing jobs to generate aggregate data from the raw data further includes filtering the raw data based on the metadata describing the raw data using the interest-driven business intelligence system, applying transformations to the raw data based on the metadata describing the raw data to generate aggregate data using the interest-driven business intelligence system, and storing the aggregate data using the interest-driven business intelligence system.

In yet another embodiment of the invention, compiling the interest-driven pipeline further includes generating ETL processing jobs to generate event-oriented data from aggregate data by identifying at least one dimension within a piece of aggregate data using the interest-driven business intelligence system, obtaining raw data corresponding to the identified at least one dimension using the interest-driven business intelligence system, filtering the obtained raw data based on the metadata describing the obtained raw data using the interest-driven business intelligence system, determining ordering data based on the metadata describing the obtained raw data using the interest-driven business intelligence system, aligning the filtered obtained raw data based on the ordering data to generate event-oriented data using the interest-driven business intelligence system, and storing the event-oriented data using the interest-driven business intelligence system.

In still another embodiment of the invention, the ordering data includes time data.

Still another embodiment of the invention includes an interest-driven business intelligence system, including raw data storage configured to contain raw data and perform extract, transform, and load (ETL) processes, where the raw data includes unstructured data, an intermediate processing layer, a data mart configured to contain metadata that describes the raw data and contained within the intermediate processing layer, and an interest-driven data visualization system, wherein the intermediate processing layer is configured to automatically generate metadata describing the raw data, derive reporting data requirements from at least one report specification based on the metadata, and compile an interest-driven data pipeline based upon the reporting data requirements, where compiling the interest-driven data pipeline includes generating ETL processing jobs to generate event-oriented data from the raw data by filtering the raw data based on the metadata describing the raw data, determining ordering data based on the metadata describing the raw data, where the ordering data includes time data, aligning the filtered raw data based on the ordering data, generating event-oriented data based on the aligned filtered raw data, and storing the event-oriented data in the data mart, generating ETL processing jobs to generate aggregate data from the raw data by filtering the raw data based on the metadata describing the raw data, applying transformations to the raw data based on the metadata describing the raw data, generating aggregate data based on the transformed data, and storing the aggregate data in the data mart, generating ETL processing jobs to generate aggregate data from event-oriented data by identifying at least one dimension within a piece of event-oriented data, obtaining raw data corresponding to the identified at least one dimension, applying transformations to the obtained raw data based on the metadata describing the obtained raw data, generating aggregate data based on the transformed data, and storing the aggregate data in the data mart, generating ETL processing jobs to generate event-oriented data from aggregate data by identifying at least one dimension within a piece of aggregate data, obtaining raw data corresponding to the identified at least one dimension, filtering the obtained raw data based on the metadata describing the obtained raw data, determining ordering data based on the metadata describing the obtained raw data, aligning the filtered obtained raw data based on the ordering data, generating event-oriented data based on the aligned data, and storing the event-oriented data in the data mart, generating reporting data including data satisfying the reporting data requirements based on the event-oriented data, generating reporting data including data satisfying the reporting data requirements based on the aggregate data, and storing the reporting data in the data mart for exploration by an interest-driven data visualization system, wherein the raw data storage is a data warehouse, and wherein the interest-driven data visualization system is configured to receive metadata describing the raw data from the intermediate processing layer and generate a user interface enabling user exploration of the metadata to define at least one report specification, where the user exploration involves selection of additional reporting data based on the metadata.

DETAILED DISCLOSURE OF THE INVENTION

Figure 1:
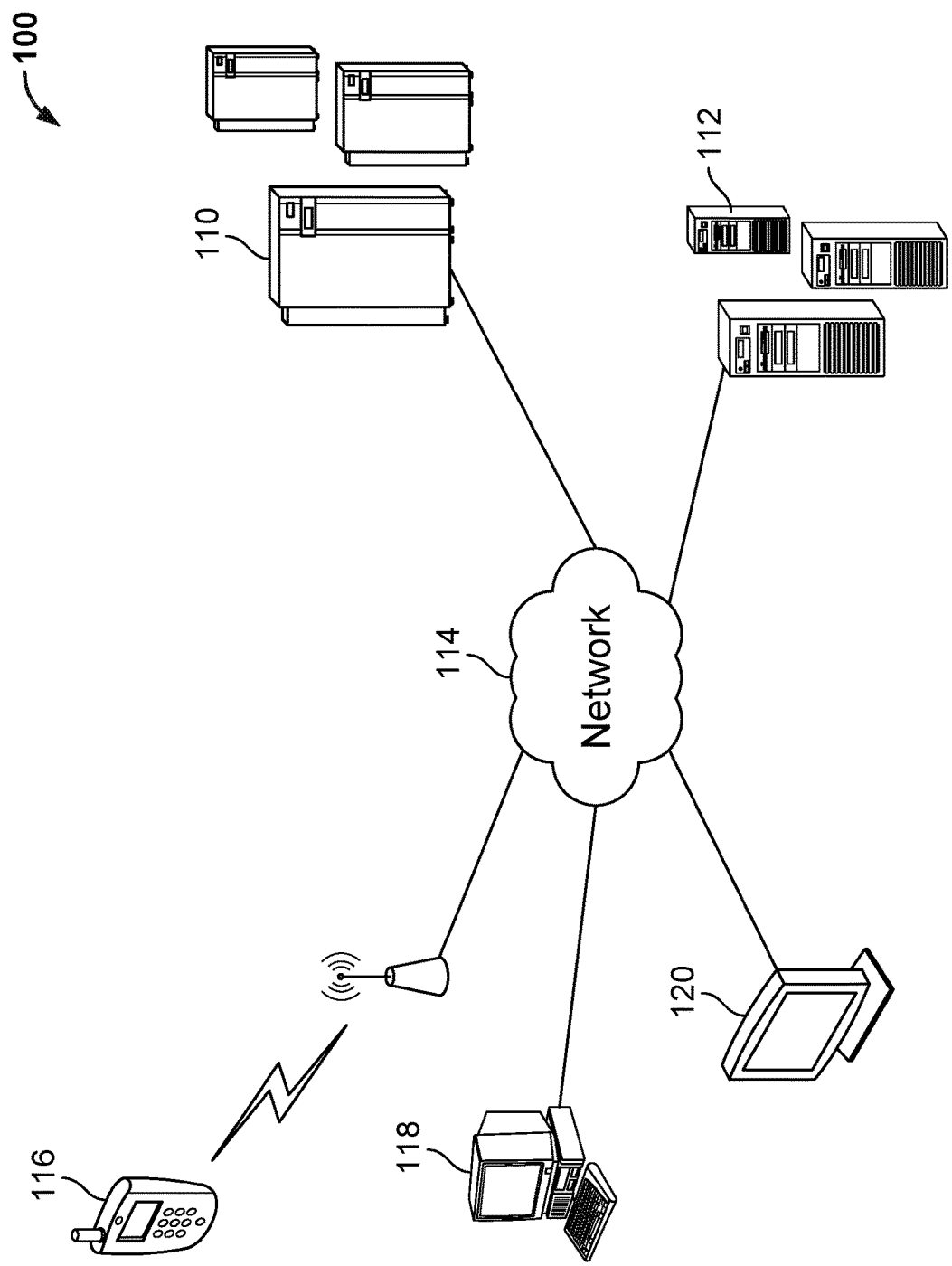
FIG. 1 is a network diagram of an interest-driven business intelligence system in accordance with an embodiment of the invention.

Turning now to the drawings, interest-driven business intelligence systems configured to utilize event-oriented data in accordance with embodiments of the invention are illustrated. Interest-driven business intelligence systems include interest-driven business intelligence server systems configured to create reporting data using raw data retrieved from distributed computing platforms. The interest-driven business intelligence server systems are configured to dynamically compile interest-driven data pipelines to provide analysts with information of interest from the distributed computing platform. The interest-driven business intelligence server system has the ability to dynamically reconfigure the interest-driven data pipeline to provide access to desired information stored in the distributed computing platform. An interest-driven data pipeline is dynamically compiled to create reporting data based on reporting data requirements determined by analysts within the interest-driven business intelligence system. Changes specified at the report level can be automatically compiled and traced backward by the interest-driven business intelligence server system to compile an appropriate interest-driven data pipeline to meet the new and/or updated reporting data requirements. Interest-driven business intelligence server systems further build metadata concerning the data available in the interest-driven business intelligence system and provide the metadata to interest-driven data visualization systems to enable the construction of reports using the metadata. In this way, interest-driven business intelligence server systems are capable of managing huge datasets in a way that provides analysts with complete visibility into the available data. Available data within an interest-driven business intelligence system includes, but is not limited to, raw data, aggregate data, filtered data, and reporting data. Interest-driven business intelligence systems and interest-driven business intelligence server systems that can be utilized in accordance with embodiments of the invention are discussed further in U.S. Pat. No. 8,447,721, titled "Interest-Driven Business Intelligence Systems and Methods of Data Analysis Using Interest-Driven Data Pipelines" and filed Feb. 29, 2012, the entirety of which is incorporated herein by reference.

In many embodiments, the reports are created using interest-driven data visualization systems configured to request and receive data from an interest-driven business intelligence server system. Systems and methods for interest-driven data visualization that can be utilized in accordance with embodiments are described in U.S. patent application Ser. No. 13/791,028, titled "Systems and Methods for Interest-Driven Data Visualization Systems Utilized in Interest-Driven Business Intelligence Systems" and filed Mar. 8, 2013, the entirety of which is hereby incorporated by reference. In order for an interest-driven data visualization system to build reports, a set of reporting data requirements are defined. These requirements specify the reporting data (derived from raw data) that will be utilized to generate the reports. The raw data can be structured, semi-structured, or unstructured. In a variety of embodiments, structured and semi-structured data include metadata, such as an index or other relationships, describing the data; unstructured data lacks any definitional structure. An interest-driven business intelligence server system can utilize reporting data already created by the interest-driven business intelligence server systems and/or cause new and/or updated reporting data to be generated to satisfy the reporting data requirements. In a variety of embodiments, reporting data requirements are obtained from interest-driven data visualization systems based upon reporting requirements defined by analysts exploring metadata describing raw data stored in the interest-driven business intelligence system.

Interest-driven business intelligence server systems are configured to provide reporting data based upon one or more reporting data requirements. Reporting data provided by interest-driven business intelligence server systems includes raw data, aggregate data, event-oriented data, and/or filtered (e.g. projected) data loaded from raw data storage that has been processed and loaded into a data structure to provide rapid access to the data. It should be noted that any transformation of data loaded from raw data storage can be utilized as appropriate to the requirements of specific embodiments of the invention. Event-oriented data includes sets of data aligned along one or more of the dimensions of (e.g. columns of data within) the sets of data. Sets of data include, but are not limited to, fact tables and dimension tables as appropriate to the requirements of specific applications in accordance with embodiments of the invention. In this way, event-oriented data can include a variety of data across multiple sets of data that are organized by ordering data. For example, a set of data describing multiple users' interactions with a web site over a period of time can be aligned along the time the user's interactions with the web site occurred. This event-oriented data can then be used to generate reporting data that can be analyzed using an interest-driven data visualization system to identify patterns associated with the users based on their interactions throughout the web site. Additionally, the event-oriented data can be aligned with other sets of data based on common dimensions (e.g. dimensions that can be mapped to each other) within the datasets. Returning to the previous example, the users' interactions with the web site can be correlated with datasets describing call logs. In this way, the actions taken by the user with respect to the web site and call information that could be related to the users' interactions with the web site. In several embodiments, reporting data derived from aggregate data is referred to as aggregate reporting data; similarly, reporting data derived from event-oriented data can be referred to as event-oriented reporting data.

In a number of embodiments, the raw data, aggregate data, event-oriented data, and/or filtered data is provided to interest-driven business intelligence server systems as source data. In many embodiments, the source data is described by metadata describing the raw data, aggregate data, event-oriented data, and/or filtered data present in the source data. In several embodiments, the source data, aggregate data, event-oriented data, and/or reporting data is stored in a data mart or other aggregate data storage associated with the interest-driven business intelligence server system. Interest-driven business intelligence server systems can load source data into a variety of reporting data structures in accordance with a number of embodiments, including, but not limited to, online analytical processing (OLAP) cubes. In a variety of embodiments, the reporting data structures are defined using reporting data metadata describing a reporting data schema. In a number of embodiments, interest-driven business intelligence server systems are configured to combine requests for one or more OLAP cubes into a single request, thereby reducing the time, storage, and/or processing power utilized by the interest-driven business intelligence system in creating source data utilized to create reporting data schemas and/or the reporting data.

In many embodiments, event-oriented reporting data is visualized and explored using interest-driven data visualization systems to analyze trends within the events identified within the event-oriented reporting data. Based on the data associated with the analyzed trends, reporting data requirements identifying aggregate data can be used to create jobs and generate the aggregate data corresponding to the analyzed trends. The aggregate data can then be utilized to generate aggregate reporting data that can be analyzed to gain deeper insights into the events and/or systems identified within the event-oriented data. Similarly, aggregate reporting data can be analyzed to identify potential events that form the basis for jobs to generate event-oriented data describing the potential events. The event-oriented data can then be utilized to generate event-oriented reporting data utilized by interest-driven data visualization systems to analyze the events identified within the event-oriented reporting data. For example, the event-oriented data can be used to identify a subset of users within a system based on their interactions with the system. This subset of users can be used to identify trends within the interactions with the system. In this way, the event-oriented data for the subset of users provides a broad overview of the trends occurring within the data. Based on the identified trends, additional data (including aggregate data and/or additional event-oriented data) can be brought in in order to facilitate a deeper exploration of the identified trends.

Systems and methods for interest-driven business intelligence systems including event-oriented data in accordance with embodiments of the invention are described below.

Interest-Driven Business Intelligence System Overview

An interest-driven business intelligence system in accordance with an embodiment of the invention is illustrated in FIG. 1. The interest-driven business intelligence system 100 includes a distributed computing platform 110 configured to store raw business data. The distributed computing platform 110 is configured to communicate with an interest-driven business intelligence server system 112 via a network 114. In several embodiments of the invention, the network 114 is a local area network, a wide area network, or the Internet; any network 114 can be utilized as appropriate to the requirements of specific applications in accordance with embodiments of the invention. In a variety of embodiments, the distributed computing platform 110 is a cluster of computing devices configured as a distributed computing platform. The distributed computing platform 110 can be configured to act as a raw data storage system and a data warehouse within the interest-driven business intelligence system. In a number of embodiments, the distributed computing platform includes a distributed file system configured to distribute the data stored within the distributed computing platform 110 across the cluster computing devices. In many embodiments, the distributed data is replicated across the computing devices within the distributed computing platform, thereby providing redundant storage of the data. The distributed computing platform 110 is configured to retrieve data from the computing devices by identifying one or more of the computing devices containing the requested data and retrieving some or all of the data from the computing devices. In a variety of embodiments where portions of a request for data are stored using different computing devices, the distributed computing platform 110 is configured to process the portions of data received from the computing devices in order to build the data obtained in response to the request for data. Any distributed file system, such as the Hadoop Distributed File System (HDFS), can be utilized as appropriate to the requirements of specific applications in accordance with embodiments of the invention. In several embodiments, the interest-driven business intelligence server system 112 is implemented using one or a cluster of computing devices. In a variety of embodiments, alternative distributed processing systems are utilized. Raw data storage is utilized to store raw data, metadata storage is utilized to store data description metadata describing the raw data, and/or report storage is utilized to store previously generated reports including previous reporting data and previous reporting data requirements. Raw data storage, metadata storage, and/or report storage can be a portion of the memory associated with the interest-driven business intelligence server system 112, the distributed computing platform 110, and/or a separate device in accordance with the specific requirements of specific embodiments of the invention.

The interest-driven business intelligence server system 112 is configured to communicate via the network 114 with one or more interest-driven data visualization systems, including, but not limited to, cellular telephones 116, personal computers 118, and presentation devices 120. In many embodiments of the invention, interest-driven data visualization systems include any computing device capable of receiving and/or displaying data. Interest-driven data visualization systems enable users to specify reports including data visualizations that enable the user to explore the raw data stored within the distributed computing platform 110 using reporting data generated by the interest-driven business intelligence server system 112. Reporting data is provided in a variety of forms, including, but not limited to, snowflake schemas and star schemas as appropriate to the requirements of specific applications in accordance with embodiments of the invention. In many embodiments, reporting data is any data that includes fields of data populated using raw data stored within the distributed computing platform 110. The reporting data requested can include aggregate reporting data and/or event-oriented reporting data as appropriate to the requirements of specific applications in accordance with embodiments of the invention.

Based upon received reporting data requirements, the interest-driven business intelligence server system 112 automatically compiles one or more interest-driven data pipelines to create or update reporting data to satisfy the received reporting data requirements. The interest-driven business intelligence server system 112 is configured to compile one or more interest-driven data pipelines configured to create and push down jobs to the distributed computing platform 110 to create source data and then applying various filtering, aggregation, and/or alignment processes to the source data to produce reporting data to be transmitted to interest-driven data visualization systems. In a number of embodiments, an alignment process includes identifying ordering data based on one or more dimensions across a plurality of pieces of source data and creating event-oriented data including data taken from the plurality of pieces of source data aligned (e.g. grouped by or ordered by) according to the ordering data. In a variety of embodiments, the dimensions and the ordering data are stored using event-oriented data metadata describing the structure (e.g. a schema) of the event-oriented data. The fact data corresponding to the event-oriented data can be combined with the event-oriented data metadata in response to the received reporting data requirements as appropriate to the requirements of specific applications in accordance with embodiments of the invention.

In many embodiments, the interest-driven business intelligence server system 112 includes reporting data, source data, event-oriented data, and/or aggregate data that partially or fully satisfy the reporting data requirements. The interest-driven business intelligence server system 112 is configured to identify the relevant existing reporting data, aggregate data, event-oriented data, and/or source data and configure an interest-driven data pipeline to create jobs requesting reporting data minimizing the redundancy between the existing data and the new reporting data requirements. In a variety of embodiments, the interest-driven business intelligence server system 112 is configured to determine redundancies between the requested data and existing data using metadata describing the data available from the distributed computing platform 110. In a number of embodiments, the metadata further describes what form the data is available in, such as, but not limited to, aggregate data, filtered data, source data, reporting data, and event-oriented data. In several embodiments, the interest-driven business intelligence server system 112 obtains a plurality of reporting data requirements and creates jobs using the interest-driven data pipeline to create source data containing data fulfilling the union of the plurality of reporting data requirements. In a variety of embodiments, the interest-driven business intelligence server system 112 is configured to identify redundant data requirements in one or more reporting data requirements and configure an interest-driven data pipeline to create jobs requesting source data fulfilling the redundant data requirements. In several embodiments, the interest-driven business intelligence server system 112 is configured to store aggregate data, event-oriented data, and/or reporting data in a data mart and utilize the stored data to identify the redundant data requirements. In a number of embodiments, the interest-driven business intelligence server system 112 is configured to identify when reporting data requirements request updated data for existing reporting data and/or source data and configure an interest-driven data pipeline to create jobs to retrieve an updated snapshot of the existing reporting data from the distributed computing platform 110.

In several embodiments, jobs pushed down to the distributed computing platform 110 by the interest-driven business intelligence server system 112 cannot be executed in a low-latency fashion. In many embodiments, the distributed computing platform 110 is configured to provide a partial set of source data fulfilling the pushed down job and the interest-driven business intelligence server system 112 is configured to create reporting data using the partial set of source data. As more source data is provided by the distributed computing platform 110, the interest-driven business intelligence server system 112 is configured to update the created reporting data based upon the received source data. In a number of embodiments, the interest-driven business intelligence server system will continue to update the reporting data until a termination condition is reached. Termination conditions can include, but are not limited to, a certain volume of source data is received, the source data provided is no longer within a particular time frame, and an amount of time to provide the source data has elapsed. In a number of embodiments, a time frame and/or the amount of time to provide the source data is determined based upon the time previously measured in the retrieval of source data for similar reporting data requirements.

The interest-driven business intelligence server system 112 is configured to compile an interest-driven data pipeline to create jobs to be pushed down to the distributed computing platform 110 in order to retrieve data. In a variety of embodiments, the jobs created using the interest-driven data pipeline are tailored to the reporting data requirements. In many embodiments, the jobs created using the interest-driven data pipeline are customized to the hardware resources available on the distributed computing platform 110. In a number of embodiments, the jobs are configured to dynamically reallocate the resources available on the distributed computing platform 110 in order to best execute the jobs. In several embodiments, the jobs are created using performance metrics collected based upon the performance of previously executed jobs.

Although a specific architecture for an interest-driven business intelligence system in accordance with an embodiment of the invention is conceptually illustrated in FIG. 1, any of a variety of architectures configured to store large data sets and to automatically build interest-driven data pipelines based upon reporting data requirements can also be utilized. Systems and methods for interest-driven business intelligence server systems and event-oriented data in accordance with embodiments of the invention are discussed in detail below.

Interest-driven Business Intelligence Server Systems

Interest-driven business intelligence server systems in accordance with embodiments of the invention are configured to create jobs to request source data from interest-driven business intelligence systems based upon received reporting data requirements and to create reporting data using the received source data. The reporting data can be aggregate reporting data and/or event-oriented reporting data based on the received reporting data requirements. It should be noted that any data derived from the source data can be utilized as reporting data as appropriate to the requirements of specific embodiments of the invention. An interest-driven business intelligence server system in accordance with an embodiment of the invention is conceptually illustrated in FIG. 2. The interest-driven business intelligence server system 200 includes a processor 210 in communication with memory 230. The memory 230 is any form of storage configured to store a variety of data, including, but not limited to, an interest-driven business intelligence application 232, source data 234, aggregate data 236, and event-oriented data 238. The interest-driven business intelligence server system 200 also includes a network interface 220 configured to transmit and receive data over a network connection. In a number of embodiments, the network interface 220 is in communication with the processor 210 and/or the memory 230. In many embodiments, the interest-driven business intelligence application 232, source data 234, aggregate data 236, and/or event-oriented data 238 are stored using an external server system and received by the interest-driven business intelligence server system 200 using the network interface 220. External server systems in accordance with a variety of embodiments include, but are not limited to, distributed computing platforms and data marts. In several embodiments, the aggregate 236 and/or event-oriented data 238 are stored in a dictionary-encoded format. In a number of embodiments, the event-oriented data 238 is stored using run length encoding and/or a sparse representation. It should be noted, however, that any encoding format could be utilized as appropriate to the requirements of specific applications in accordance with embodiments of the invention. In a variety of embodiments, the event-oriented data 238 is stored as parallel arrays of data with each array representing the values of a particular field of data.

The interest-driven business intelligence application 232 configures the processor 210 to perform an interest-driven business intelligence process. In many embodiments, an interest-driven business intelligence process includes creating jobs using an interest-driven data pipeline to retrieve source data in response to reporting data requirements. The source data can then be utilized to generate aggregate data and/or event-oriented data as appropriate to the requirements of specific applications in accordance with embodiments of the invention. In a variety of embodiments, the created jobs are based upon redundancies between reporting data requirements and existing source data 234, aggregate data 236, and/or event-oriented data 238. In a number of embodiments, the interest-driven business intelligence process includes updating reporting data based upon incrementally received source data and/or updated source data. In several embodiments, the interest-driven business intelligence process includes obtaining a request for aggregate reporting data and generating the aggregate reporting data based on one or pieces of event-oriented data. Similarly, the interest-driven business intelligence process can also include obtaining a request for event-oriented reporting data and generating the event-oriented reporting data based on one or pieces of aggregate data.

Figure 2:
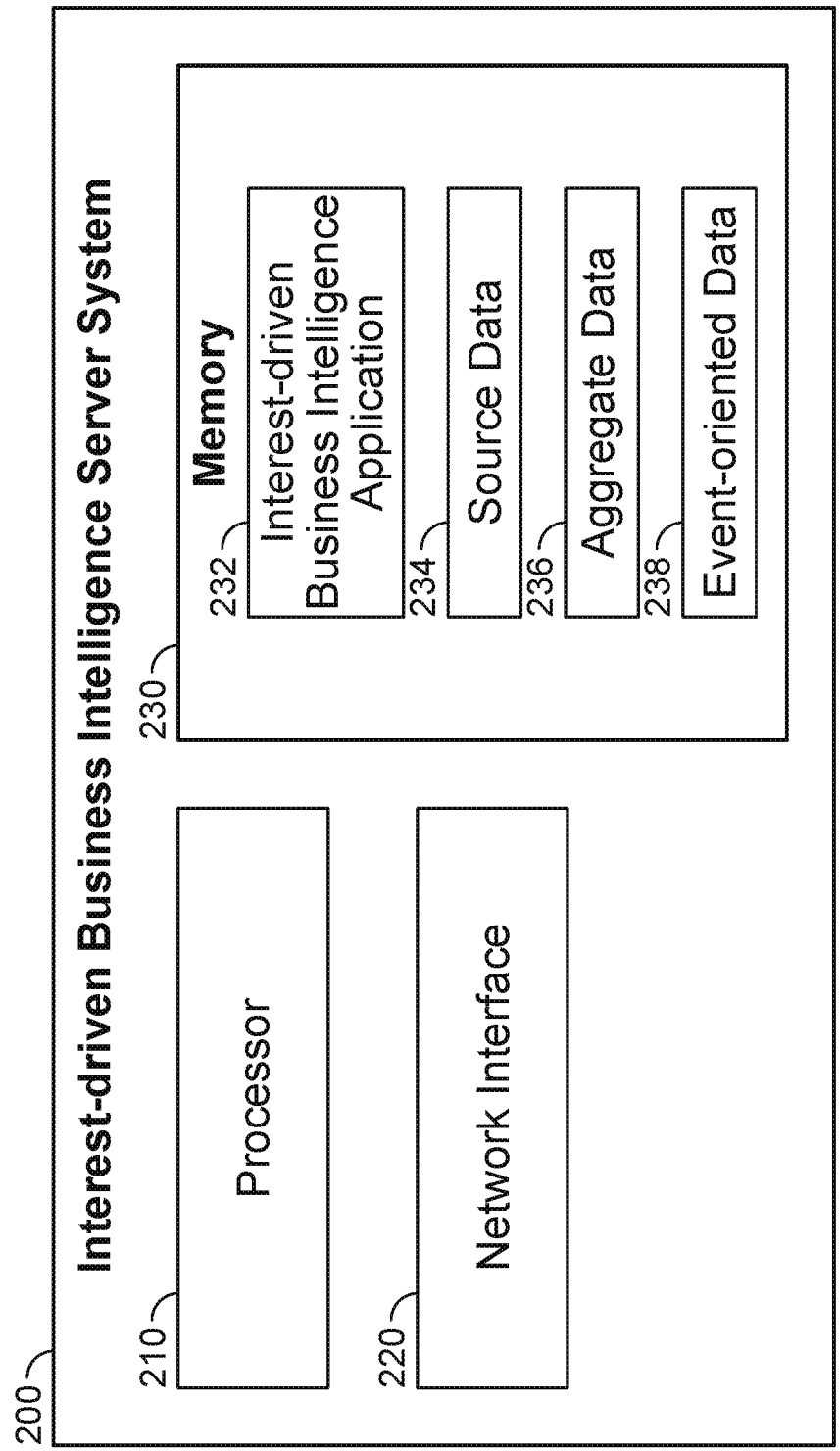
FIG. 2 is a conceptual illustration of an interest-driven business intelligence server system in accordance with an embodiment of the invention.

Although a specific architecture for an interest-driven business intelligence server system in accordance with an embodiment of the invention is conceptually illustrated in FIG. 2, any of a variety of architectures, including those that store data or applications on disk or some other form of storage and are loaded into memory at runtime, can also be utilized. Processes for obtaining and generating aggregate data and event-oriented data in accordance with embodiments of the invention are discussed further below.

Aggregate Data and Event-Oriented Data

In several embodiments, event-oriented data and aggregate data can both be constructed based on a number of facts and dimensions within a particular data schema. In interest-driven business intelligence systems, the data schema can describe source data, aggregate data, event-oriented data, and/or reporting data. Other data, including metadata describing raw data available from distributed computing platform, can also be utilized within the data schema to aid in the definition and population of aggregate data and/or event-oriented data as appropriate to the requirements of specific applications in accordance with embodiments of the invention.

Figure 3A:
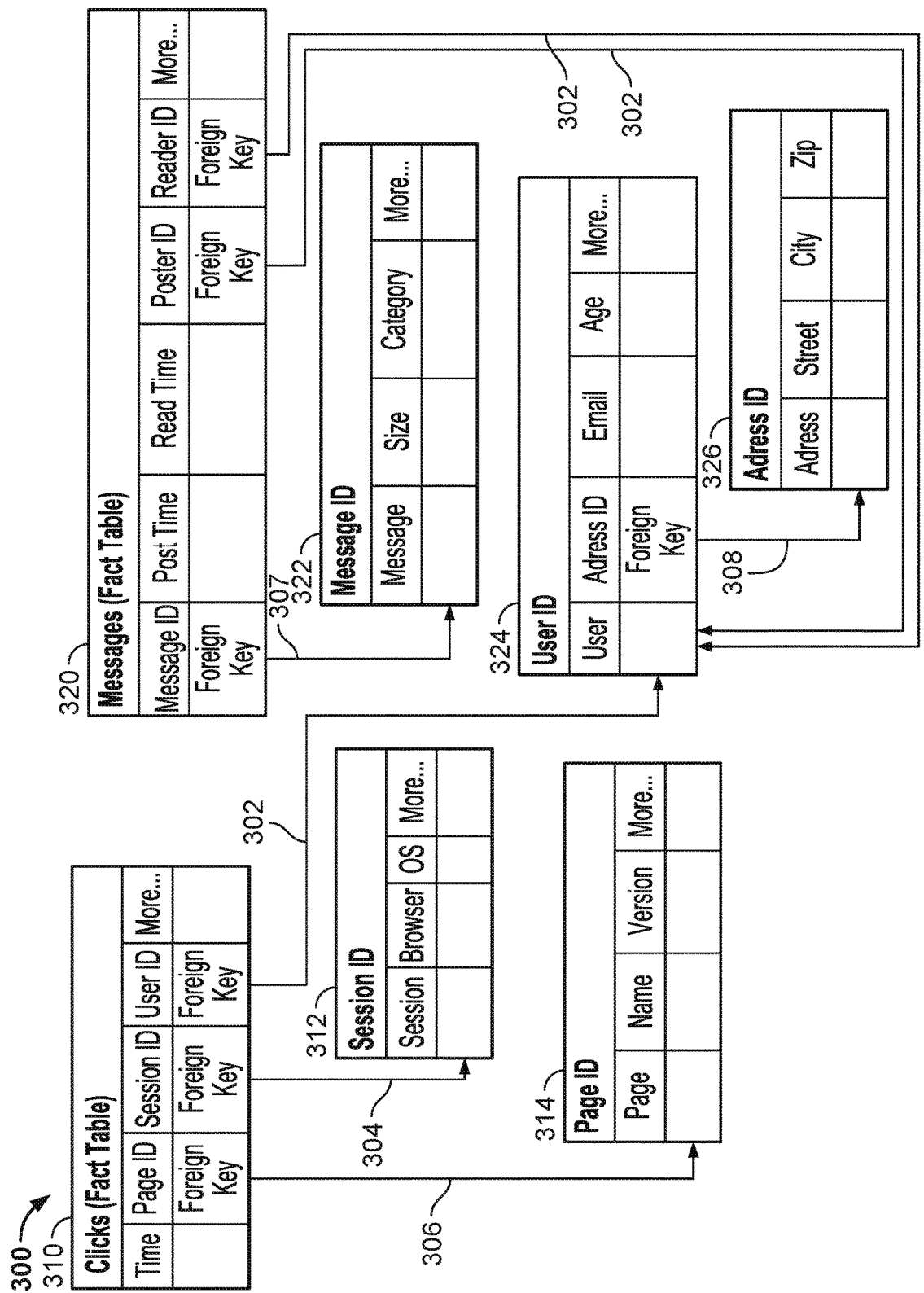
FIG. 3A is a conceptual illustration of a schema for aggregate data that can be utilized in an interest-driven business intelligence system in accordance with an embodiment of the invention.

Turning now to FIG. 3A, a conceptual illustration of a piece of aggregate data in accordance with an embodiment of the invention is shown. The aggregate data 300 includes a Clicks fact table 310 and a Messages fact table 320. The Clicks fact table 310 is related to dimension tables Session 312 and Page 314 via references 304 and 306. Messages fact table 320 is related to dimension table Message 322 via relationship 307. Dimension table User 324 is related to both the Clicks fact table 310 and the Messages fact table 320 via relationships 302. Additionally, the dimension table User 324 is related to dimension table Address 326 via relationship 308. In a variety of embodiments, the relationships are references between sets of data (e.g. a fact table and/or a dimension table) via a foreign key relationship, although any relationship can be utilized as appropriate to the requirements of specific applications in accordance with embodiments of the invention. In this way, aggregate reporting metadata can be generated with respect to the Clicks fact table 310 and/or the Messages fact table 320 via the relationships and include the dimensions described in the various dimension tables that share relationships with the fact tables. In several embodiments, the dimensions included in the aggregate reporting metadata are selected based on reporting data requirements. By combining the aggregate reporting metadata with facts (e.g. rows of data) stored within each of the fact tables and/or dimension tables, aggregate reporting data can be generated. The facts included in the aggregate reporting data can be filtered and/or aggregated based on the reporting data requirements as appropriate to the requirements of specific applications in accordance with embodiments of the invention.

Figure 3B:
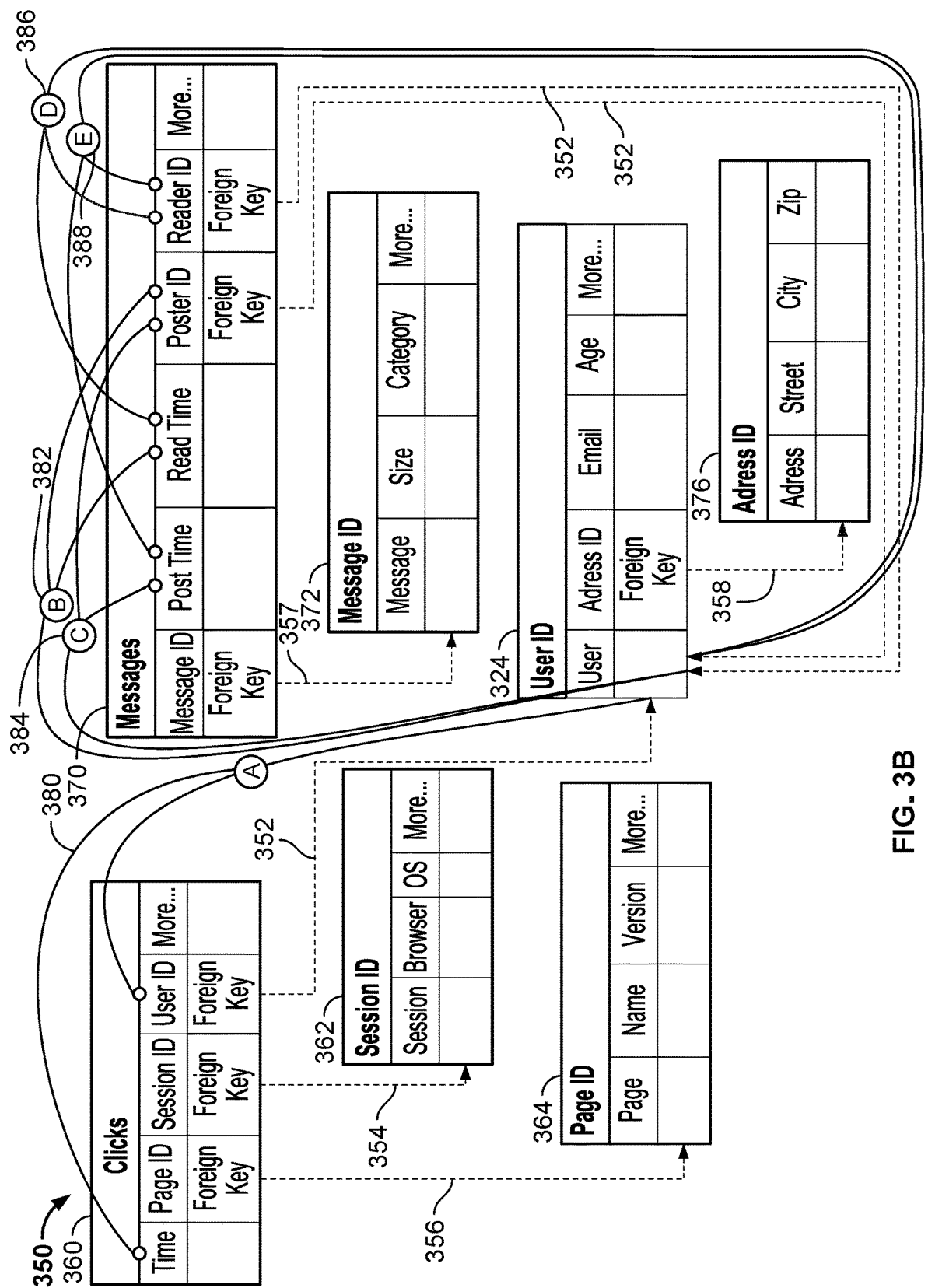
FIG. 3B is a conceptual illustration of a schema for event-oriented data that can be utilized in an interest-driven business intelligence system in accordance with an embodiment of the invention.

Turning now to FIG. 3B, a conceptual illustration of a piece of event-oriented data in accordance with an embodiment of the invention is shown. The event-oriented data 350 includes a Clicks fact table 360 and a Messages fact table 370. The Clicks fact table 360 is related to dimension tables Session 362 and Page 364 via references 354 and 356. Messages fact table 370 is related to dimension table Message 372 via relationship 357. Dimension table User 374 is related to both the Clicks fact table 360 and the Messages fact table 370 via relationships 352. Additionally, the dimension table User 374 is related to dimension table Address 376 via relationship 358. In a variety of embodiments, the relationships are references between sets of data (e.g. a fact table and/or a dimension table) via a foreign key relationship, although any relationship can be utilized as described above. Additionally, the event-oriented data can be aligned according to one or more pieces of ordering data. The ordering data includes one or more dimensions contained within the fact tables and/or dimension tables. A variety of pieces of ordering data can be utilized to organize the facts within the Clicks fact table 360 and Messages fact table 370 into pieces of event-oriented data. Although time-based data is commonly utilized as ordering data, any dimension can be utilized as appropriate to the requirements of specific applications in accordance with embodiments of the invention. A variety of ordering data, including click stream—per user ordered by click time data 380, message stream—per user ordered by read time 382, message stream—per user ordered by posting time 384, message stream—per user ordered by read time 386, and message stream—per user ordered by posting time 388 can be utilized to order the event-oriented data 350 as appropriate to the requirements of specific applications in accordance with embodiments of the invention.

In this way, event-oriented reporting metadata can be generated with respect to the Clicks fact table 360 and/or the Messages fact table 370 via the relationships and include the dimensions described in the various dimension tables that share a relationship with the fact tables ordered by one or more pieces of ordering data. In several embodiments, the dimensions included in the event-oriented reporting metadata and/or the ordering data are determined based on reporting data requirements. By combining the event-oriented reporting metadata with facts (e.g. rows of data) stored within each of the fact tables and/or dimension tables and aligning the data according to the ordering data, event-oriented reporting data can be generated.

While specific examples of aggregate data and event-oriented data are conceptually illustrated in FIGS. 3A and 3B, any pieces of aggregate data and event-oriented data can be utilized as appropriate to the requirements of specific applications in accordance with embodiments of the invention. Techniques for obtaining and generating event-oriented data in accordance with embodiments of the invention are discussed further below.

Obtaining Event-Oriented Reporting Data

Figure 4:
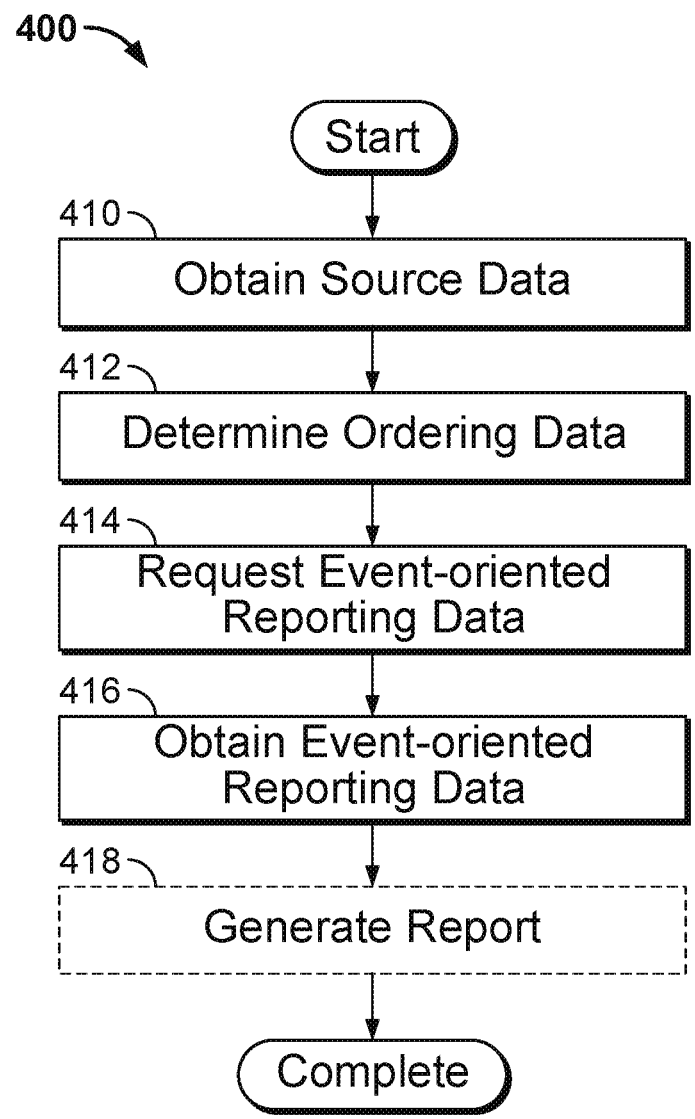
FIG. 4 is a flow chart illustrating a process for obtaining event-oriented reporting data in accordance with an embodiment of the invention.

By analyzing data aligned by one or more dimensions, certain patterns of interest can be identified for exploration. Many of these patterns are not apparent until the data is aligned along the dimensions. Event-oriented reporting data includes data organized in a variety of dimensions and aligned according to at least one of the dimensions. Interest-driven data visualization systems in accordance with embodiments of the invention are configured to obtain event-oriented reporting data. A process for obtaining event-oriented reporting data in accordance with an embodiment of the invention is illustrated in FIG. 4. The process 400 includes obtaining (410) source metadata and determining (412) ordering data. Event-oriented reporting data is requested (414) and event-oriented reporting data is obtained (416). In a variety of embodiments, a report is generated (418).

In many embodiments, source data is obtained (410) utilizing processes similar to those described above. In a number of embodiments, ordering data is determined (412) based on one or more dimensions contained within pieces of the obtained (410) source data. As described above, ordering data identifies one or more dimensions of the source data. The ordering data can be determined (412) dynamically by an interest-driven data visualization system and/or based on reporting data requirements determined during the exploration of the source data as appropriate to the requirements of specific applications in accordance with embodiments of the invention. In several embodiments, event-oriented reporting data is requested (414) by creating event-oriented request data identifying at least one piece of source data and the determined (412) ordering data. In a variety of embodiments, the request (414) for event-oriented reporting data is transmitted to an interest-driven business intelligence system. In many embodiments, event-oriented reporting data is obtained (416) from an interest-driven business intelligence system. In a number of embodiments, event-oriented reporting data is obtained (416) based on data already present within an interest-driven data visualization system. In several embodiments, a report is generated (418) based on the obtained (416) event-oriented reporting data.

Although a specific process for obtaining event-oriented reporting data is described above with respect to FIG. 4, any of a variety of processes, including those that align the data along multiple ordering dimensions, can be utilized in accordance with embodiments of the invention. Processes for the creation and updating of event-oriented data in accordance with embodiments of the invention are discussed further below.

Obtaining Event-Oriented Data

Figure 5:
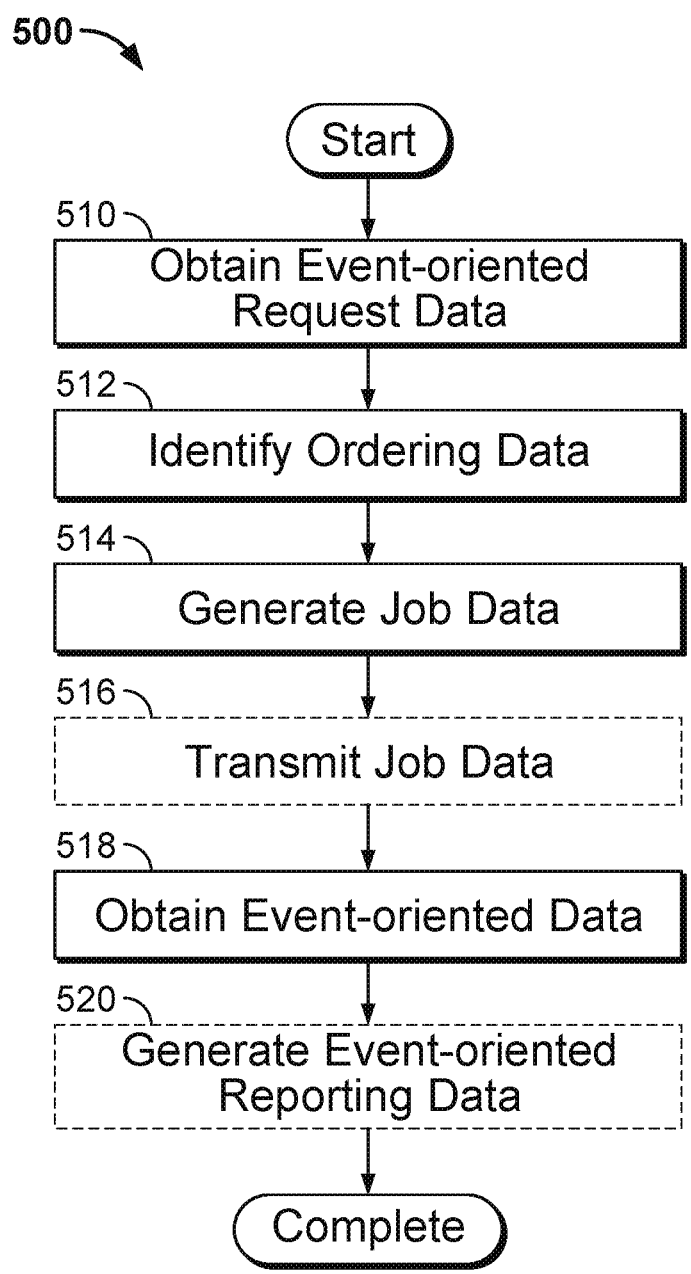
FIG. 5 is a flow chart illustrating a process for obtaining event-oriented data in accordance with an embodiment of the invention.

During the exploration of data, particular features of the data may warrant additional inspection. Many of these pieces of data provide a variety of insights into the data when analyzed in conjunction with disparate pieces of data (e.g. pieces of data not included in the data currently being explored) occurring in relation to the pieces of data. For example, data describing a users' interactions with a particular page within a website can provide useful insights regarding a users' interactions (or lack thereof) within another page within the website. By analyzing the users' interaction flow throughout the website, pages within the website that perform well (or poorly) can be identified and additional analysis can be performed with respect to those portions of the web site. As discussed above, event-oriented data is aligned according to one or more pieces of ordering data. Interest-driven business intelligence server systems in accordance with embodiments of the invention are configured to obtain event-oriented data by compiling an interest-driven data pipeline to obtain the necessary data aligned according to the ordering data. A process for obtaining event-oriented data in accordance with an embodiment of the invention is illustrated in FIG. 5. The process 500 includes obtaining (510) event-oriented request data and identifying (512) ordering data. Job data is generated (514) and, in many embodiments, job data is transmitted (516). Event-oriented data is obtained (518) and, in a number of embodiments, event-oriented reporting data is generated (520).

In a variety of embodiments, event-oriented request data is obtained (510) from an interest-driven data visualization system. The event-oriented request data includes, but is not limited to, event-oriented data metadata and/or requested event-oriented facts. In several embodiments, ordering data is identified (512) within the obtained (510) event-oriented request data. In a number of embodiments, the generated (514) job data configures a distributed computing platform to create event-oriented data fulfilling the event-oriented request data and aligned based on the identified (512) ordering data. In many embodiments, the generated (514) job data takes into account source data already present within an interest-driven business intelligence server system that fulfills a portion of the obtained (510) event-oriented request data. In a variety of embodiments, the job data is transmitted (516) to a distributed computing platform utilizing techniques similar to those described above. The obtained (518) event-oriented data includes event-oriented data metadata describing the dimensions of the event-oriented data and/or the facts (e.g. rows of data) corresponding to the dimensions described in the event-oriented data metadata and/or the obtained (510) event-oriented request data. In several embodiments, the obtained (518) event-oriented data includes additional dimensions and/or facts not directly requested in the obtained (510) event-oriented request data. In a number of embodiments, event-oriented reporting data is generated (520) based on the obtained (510) event-oriented request data and the obtained (518) event-oriented data and aligned by the identified (512) ordering data.

In a variety of embodiments, the generated (514) job data and/or the obtained (518) event-oriented data can be adjusted in order to account for differences between data sources providing the raw data utilized in the creation of the data used throughout the interest-driven business intelligence server system. Adjustments to data include, but are not limited to, accounting for timing differences between systems and tracking identification information across systems. Alignments of data can be performed by shifting the data to a common format and/or by performing mappings of data to a common set of data (e.g. a common dimension). For example, with respect to time-based data, data acquired from multiple sources can all be converted to Coordinated Universal Time (UTC) in order to account for different time bases across systems. Similarly, time-based data can be adjusted based on threshold values to account for timing differences between the system clocks of a variety of systems providing data. Additionally, with respect to identification-based data (e.g. user IDs), a variety of universal tracking information can be utilized to map identification-based data to the universal tracking information in order to account for differences between the identification-based data across the systems providing the data. In this way, users can be identified across disparate systems (and disparate portions within a system) in order to provide the ability to analyze the user's data across the systems.

A specific process for obtaining event-oriented data is described above with respect to FIG. 5; however, any of a variety of processes, including those that obtain event-oriented data in response to a request for data other than a job transmitted to a distributed computing platform, can be utilized in accordance with embodiments of the invention. Techniques for aligning events within data in accordance with embodiments of the invention are described below.

Aligning Events in (Structured) Data

Figure 6:
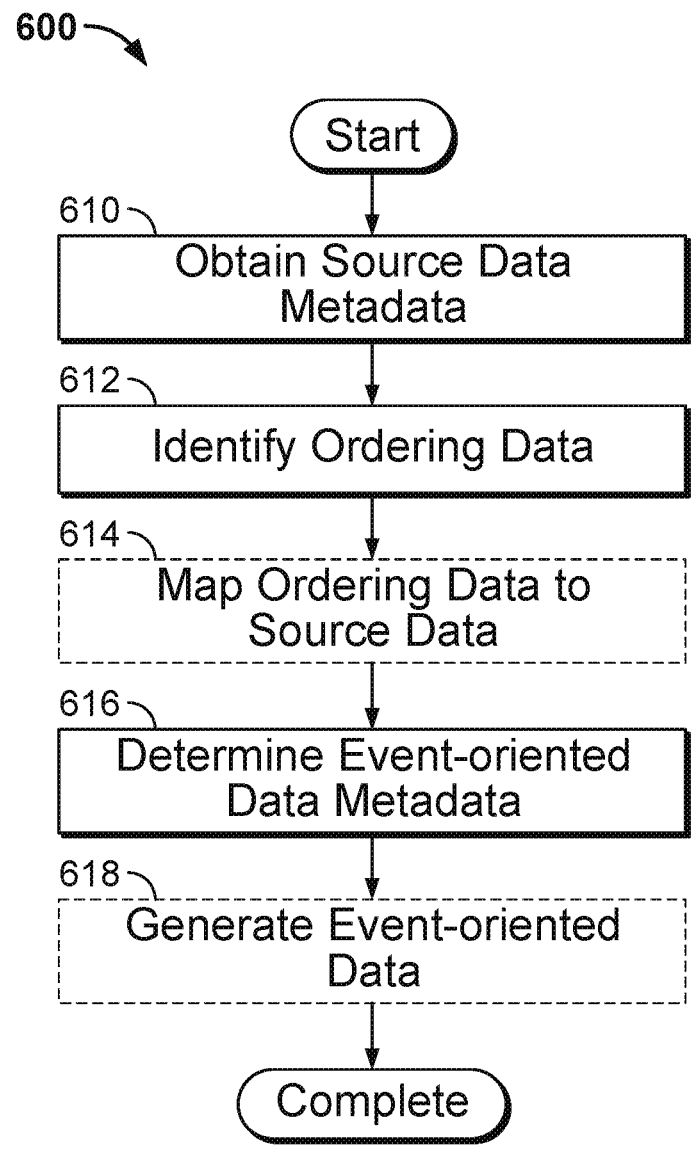
FIG. 6 is a flow chart illustrating a process for aligning events in accordance with an embodiment of the invention.

In many cases, analysts want to explore trends occurring in data already present in an interest-driven business intelligence system. Interest-driven business intelligence server systems in accordance with many embodiments of the invention are configured to determine event-oriented data metadata based on source data already present within the interest-driven business intelligence system. A process for aligning events in data in accordance with an embodiment of the invention is illustrated in FIG. 6. The process 600 includes obtaining (610) source data metadata and identifying (612) ordering data. In many embodiments, ordering data is mapped (614) to source data. Event-oriented data metadata is determined (616) and, in a variety of embodiments, event-oriented data is generated (618).

Source data metadata describes the pieces of data available within a set of source data. In several embodiments, the source data describes one or more dimensions (e.g. columns) of data within the set of source data. In many embodiments, structured data metadata is obtained (610) utilizing techniques similar to those described above. In a number of embodiments, ordering data is identified (612) based on the pieces of data available within the source data. In a variety of embodiments, the ordering data (614) is mapped to one or more dimensions described in the source data metadata. In this way, differences between the identified (612) ordering data and the obtained (610) source data metadata can be resolved in order to create event-oriented data fulfilling a particular request. Additionally, the ordering data can be mapped (614) to source data utilizing processes similar to those described above. In several embodiments, event-oriented data metadata is determined (616) based on the obtained (610) source data metadata and the identified (612) ordering data using processes similar to those described above. If applicable, the mapped (614) ordering data can also be utilized in the determination (616) of the event-oriented data metadata. In many embodiments, event-oriented data is generated (618) based on the event-oriented data metadata and fact (e.g. rows of data) contained within the source data described by the obtained (610) source data metadata utilizing techniques similar to those described above.

Although a specific process for aligning events within data is described above with respect to FIG. 6, any of a variety of processes, including those that align events within aggregate data, can be utilized in accordance with embodiments of the invention. Processes for creating aggregate data based on event-oriented data in accordance with embodiments of the invention are discussed further below.

Generating Aggregate Reporting Data based on Event-Oriented Data

Figure 7A:
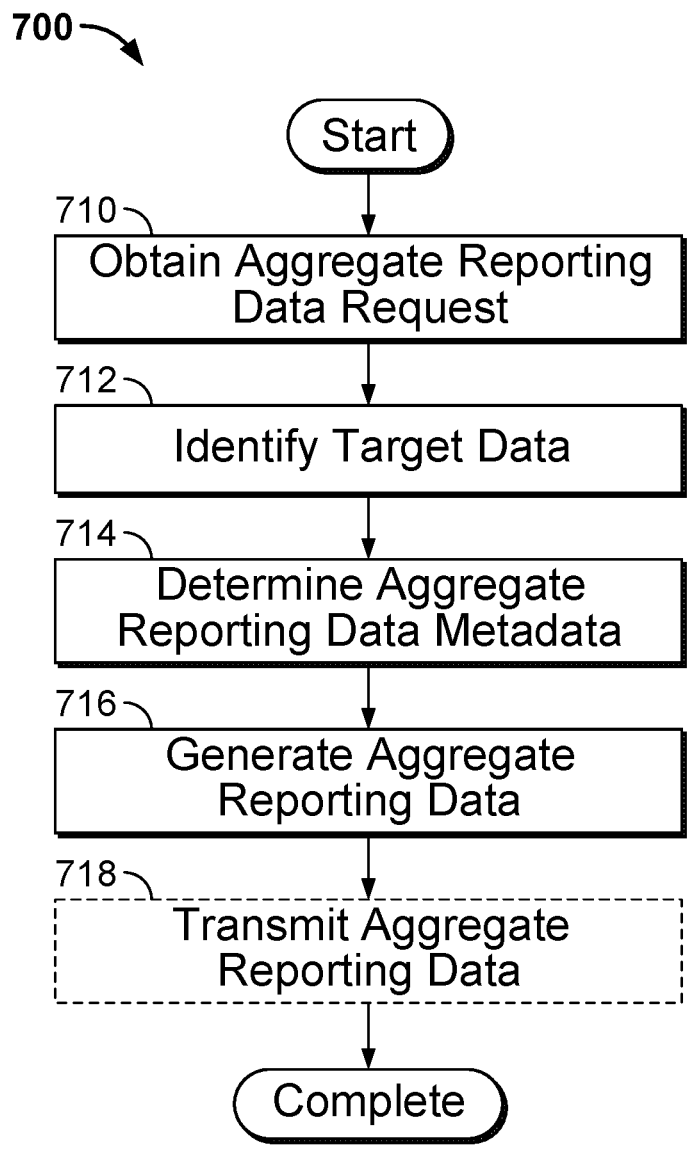
FIG. 7A is a flow chart illustrating a process for generating aggregate reporting data based on event-oriented data in accordance with an embodiment of the invention.

During the exploration of event-oriented data, interesting features of the data can be identified and it is desirable to drill down into those features of the event-oriented data. In order to support the additional analysis of event-oriented data, aggregate reporting data can be generated in order to augment the identified features within the data. Returning to the example described above with respect to FIG. 5, when a particular web page is identified within the event-oriented data, aggregate data describing the interactions across all users of the web site can be obtained. This aggregate data can be used to perform an in-depth exploration of the interactions with the web page. At the same time, the resources of the interest-driven business intelligence system are efficiently utilized by focusing the data retrieved and processed in the exploration of the data to those portions of the data that contain information relevant to the exploration of the data. Interest-driven business intelligence server systems in accordance with embodiments of the invention are configured to generate aggregate reporting data based on event-oriented data. A process for generating aggregate data based on event-oriented data in accordance with an embodiment of the invention is illustrated in FIG. 7A. The process 700 includes obtaining (710) an aggregate reporting data request and identifying (712) target data. Aggregate reporting data metadata is determined (714) and aggregate reporting data is generated (716). In a variety of embodiments, aggregate reporting data is transmitted (718).

An aggregate data reporting request includes, but is not limited to, one or more dimensions and/or facts within a piece of event-oriented reporting data. Other data can be included in an aggregate reporting data request as appropriate to the requirements of specific applications in accordance with embodiments of the invention. In a variety of embodiments, an aggregate reporting data request is obtained (710) from an interest-driven data visualization system. In several embodiments, the obtained (710) aggregate reporting data requests identifies dimensions and/or facts identified during the exploration of at least one piece of event-oriented reporting data and/or at least one piece of aggregate reporting data. In a number of embodiments, target data is identified (712) based on the dimensions and/or facts identified in the obtained (710) reporting data request. In a variety of embodiments, the target data is identified (712) based on source data metadata describing the dimensions of data available within source data stored using an interest-driven business intelligence server system. In a number of embodiments, the source data metadata describes facts and/or dimensions that can be obtained from a distributed computing platform. In several embodiments, aggregate reporting data metadata is determined (714) based on the obtained (710) aggregate reporting data request. In a variety of embodiments, aggregate reporting data metadata is determined (714) based on the identified (712) target data. As described above, aggregate reporting data is generated (716) by associating a plurality of facts (e.g. rows of data) that are obtained based on the determined (714) aggregate reporting data metadata. Generating (716) aggregate reporting data can include filtering and/or aggregating source data, event-oriented data, and/or aggregate data utilizing processes similar to those described above as appropriate to the requirements of specific applications in accordance with embodiments of the invention. In a number of embodiments, the generated (716) aggregate reporting data is transmitted (718) to one or more interest-driven data visualization systems utilizing techniques similar to those described above.

Specific processes for generating aggregate reporting data are described above with respect to FIG. 7A; however, any of a variety of processes, including those that generate aggregate reporting data based on data other than event-oriented data and those that store the determined aggregate reporting data metadata, can be utilized in accordance with embodiments of the invention. Techniques for creating event-oriented reporting data based on aggregate data in accordance with embodiments of the invention are discussed further below.

Generating Event-Oriented Reporting Data based on Aggregate Data

Figure 7B:
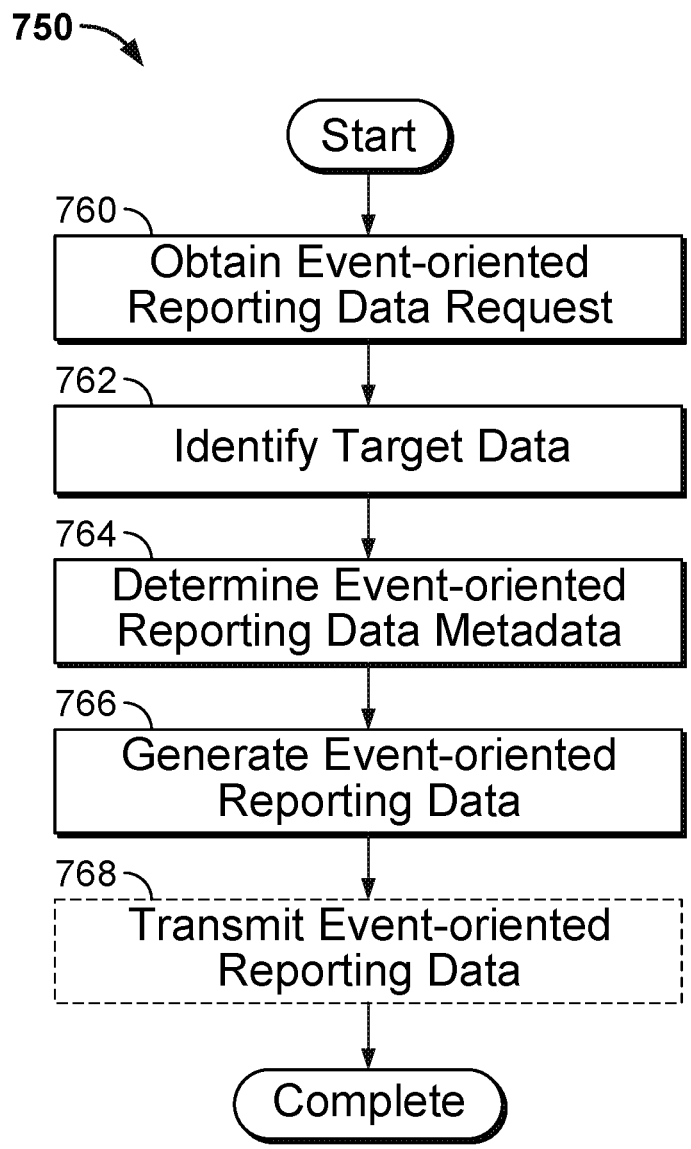
FIG. 7B is a flow chart illustrating a process for generating event-oriented reporting data based on aggregate data in accordance with an embodiment of the invention.

During the exploration of aggregate data, interesting trends within the data can be identified and it is desirable to drill down into those trends. In order to support the additional analysis of the aggregate data, event-oriented reporting data is generated in order to bring in additional context regarding the data being explored. Returning now to the example described with respect to FIGS. 5 and 7A, when analyzing the aggregate data describing the interactions with web page, a particular class of users can be identified that exhibit interesting interaction patterns. Event-oriented data can be generated that describes the interactions that the identified class of users takes with multiple pages within the web site. In this way, the event-oriented data generated based on the aggregate data can be utilized to explore the interactions a particular group of users has with the web site. By exploring the group of users, potential improvements to the web site can be identified that would improve the performance of the web site with respect to the users similar to those in the identified group of users. Interest-driven business intelligence server systems in accordance with embodiments of the invention are configured to generate event-oriented reporting data based on aggregate data. A process for generating aggregate data based on event-oriented data in accordance with an embodiment of the invention is illustrated in FIG. 7B. The process 750 includes obtaining (760) an event-oriented data request. Target data is identified (762) and event-oriented reporting data metadata is determined (764). Event-oriented reporting data is generated (766) and, in several embodiments, event-oriented reporting data is transmitted (768).

An event-oriented data reporting request includes, but is not limited to, one or more dimensions and/or facts within a piece of event-oriented reporting data along with ordering data identifying at least one of the dimensions used to align the data. Other data can be included in an event-oriented reporting data request as appropriate to the requirements of specific applications in accordance with embodiments of the invention. In a variety of embodiments, an event-oriented reporting data request is obtained (760) from an interest-driven data visualization system. In several embodiments, the obtained (760) event-oriented reporting data request identifies dimensions and/or facts identified during the exploration of at least one piece of event-oriented reporting data and/or aggregate reporting data. In a number of embodiments, target data is identified (762) utilizing processes similar to those described above. The determined (764) event-oriented reporting data metadata includes one or more pieces of ordering data. In several embodiments, event-oriented reporting data metadata is determined (764) based on the obtained (760) event-oriented reporting data request. In a variety of embodiments, event-oriented reporting data metadata is determined (764) based on the identified (762) target data. As described above, event-oriented reporting data is generated (766) by associating a plurality of facts (e.g. rows of data) that are obtained based on the determined (764) event-oriented reporting data metadata. The generated (766) event-oriented reporting data includes aligning the plurality of facts within the event-oriented reporting data according to the ordering data. Generating (766) event-oriented reporting data can include filtering and/or aggregating source data, event-oriented data, and/or aggregate data utilizing processes similar to those described above as appropriate to the requirements of specific applications in accordance with embodiments of the invention. In a number of embodiments, the generated (766) event-oriented reporting data is transmitted (768) to one or more interest-driven data visualization systems utilizing techniques similar to those described above.

Although a specific process for generating event-oriented reporting data is described above with respect to FIG. 7B, any of a variety of processes, including those that generate event-oriented reporting data based on data other than aggregate data, can be utilized in accordance with embodiments of the invention. Processes for updating event-oriented data in accordance with embodiments of the invention are described in detail below.

Updating Event-Oriented Data

Figure 8:
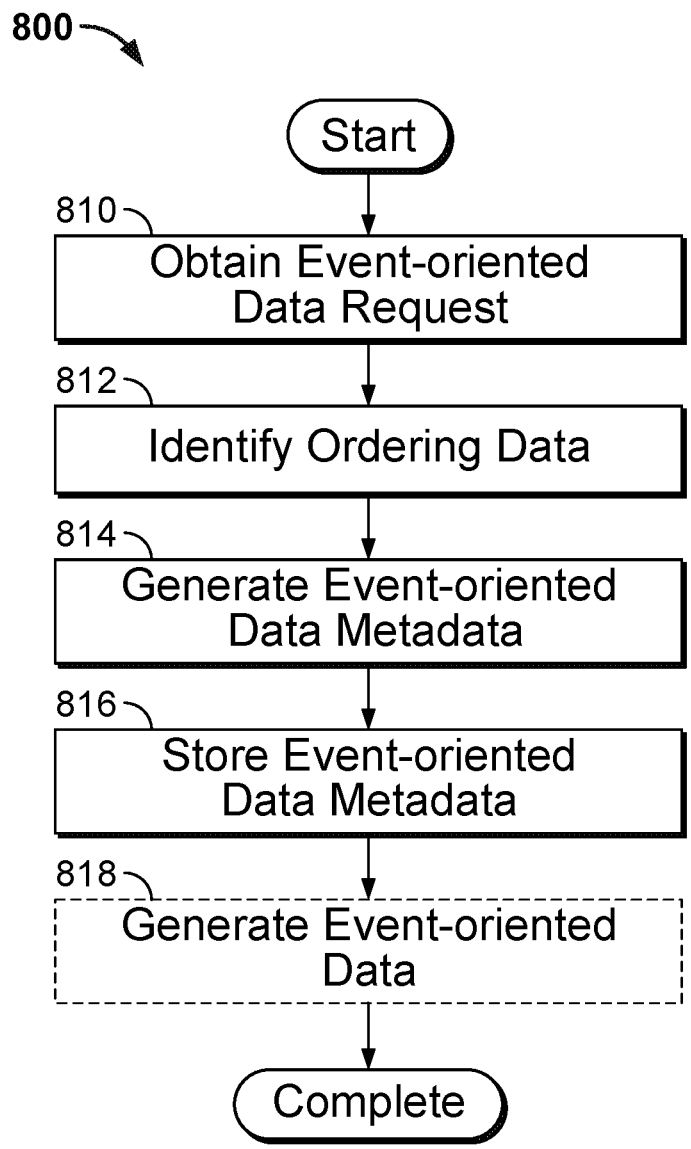
FIG. 8 is a flow chart illustrating a process for updating event-oriented data in accordance with an embodiment of the invention.

As described above, trends are often identified across multiple dimensions within the data being explored. As part of the analysis of the identified trends, it is often beneficial to continue monitoring the identified trends. Interest-driven business intelligence server systems in accordance with embodiments of the invention are configured to store event-oriented data metadata and provide updated event-oriented data on request. A process for updating event-oriented data in accordance with an embodiment of the invention is illustrated in FIG. 8. The process 800 includes obtaining (810) an event-oriented data request and identifying (812) ordering data. Event-oriented data metadata is generated (814) and event-oriented data metadata is stored (816). In a number of embodiments, event-oriented data is generated (818).

In a number of embodiments, an event-oriented data request is obtained (810) and ordering data is identified (812) utilizing processes similar to those described above. In many embodiments, generating (814) event-oriented data metadata is based on the event-oriented data request and/or the ordering data using processes similar to those described above. The event-oriented data metadata is stored (816) so that generating (818) event-oriented data can be performed in response to a request for the event-oriented data. The event-oriented data metadata can be stored using a data mart, an interest-driven data visualization system, an interest-driven business intelligence server system, and/or a distributed computing platform as appropriate to the requirements of specific applications in accordance with embodiments of the invention. In a variety of embodiments, event-oriented data is generated (818) using the event-oriented metadata and source data stored in an interest-driven business intelligence system utilizing processes similar to those described above.

In many embodiments generating (818) event-oriented data includes identifying redundant information already present within an interest-driven business intelligence server system and/or a data mart. In a variety of embodiments, redundant information is identified using reporting data schemas defining the structure of reporting data and/or source data schemas defining the structure of source data. In many embodiments, redundant information is determined using one or more files stored using the interest-driven business intelligence server system; redundancies can be determined using the data contained in the files and/or metadata associated with the files, including the creation date of the files and/or the last modified date of the files. In several embodiments, job data can be created and executed in order to generate (818) event-oriented data from a distributed computing platform that is not present in the redundant information. Based on the identified redundant information, the job data can be targeted to minimize the amount of duplicate data retrieved from a distributed computing platform. This allows the resources of the distributed computing platform and/or the interest-driven business intelligence server system to be more efficiently used than if the redundant information not been identified.

A specific process for updating event-oriented data is described above with respect to FIG. 8; however, any of a variety of processes, including those that generate updated event-oriented data utilizing techniques other than those described above, can be utilized in accordance with embodiments of the invention. Additionally, any of the various processes described above can be performed in alternative sequences and/or in parallel (on different computing devices) in order to achieve similar results in a manner that is more appropriate to the requirements of a specific application.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An interest-driven business intelligence system, comprising:
   raw data storage configured to contain raw data and perform extract, transform, and load (ETL) processes, wherein the raw data is provided by various data sources, the various data sources including a first data source and a second data source;
   a data mart configured to contain metadata and aggregate data, wherein the aggregate data includes clicks and messages, wherein the clicks includes page ID, session ID, user ID, address ID, or any combination thereof, and wherein the messages includes message ID, the metadata describing the raw data, wherein the aggregate data comprises structured data generated using the ETL processes from the raw data; and
   an intermediate processing layer;
   wherein the intermediate processing layer is configured to automatically:
     generate the metadata describing the raw data;
     derive reporting data requirements from at least one report specification based on the metadata; and compile an interest-driven data pipeline based upon the reporting data requirements, comprising to:
  generate ETL processing jobs to generate the aggregate data from the raw data by:
    filtering the raw data based on the metadata describing the raw data;
    applying transformations to the raw data based on the metadata describing the raw data;
    generating aggregate data based on the transformed data; and
    storing the aggregate data in the data mart;
  generate ETL processing jobs to generate event-oriented data from the raw data by:
    filtering the raw data based on the metadata describing the raw data;
    determining ordering data based on the metadata describing the raw data;
    aligning the filtered raw data based on the ordering data;
    generating event-oriented data based on the aligned filtered raw data;
    adjusting the event-oriented data to account for timing differences between the various data sources, comprising:
      converting first event-oriented data associated with the first data source and second event-oriented data associated with the second data source to a coordinated universal time (UTC) to shift the event-oriented data to a common time base; and
    storing the event-oriented data in the data mart;
  generate reporting data including data satisfying the reporting data requirements based on the event-oriented data and the aggregate data;
  identify trends across multiple dimensions within the reporting data; and
  store the reporting data in the data mart for exploration by an interest-driven data visualization system.

2. The interest-driven business intelligence system of claim 1, wherein the raw data comprises unstructured data.

3. The interest-driven business intelligence system of claim 1, wherein the raw data storage is a data warehouse.

4. The interest-driven business intelligence system of claim 3, wherein the data warehouse is implemented utilizing a system selected from a distributed computing system, a database management system, a NoSQL database, or any combination thereof.

5. The interest-driven business intelligence system of claim 3, wherein the data warehouse is a distributed computing system implemented utilizing Hadoop.

6. The interest-driven business intelligence system of claim 3, wherein the data warehouse is configured to store data generated utilizing the intermediate processing layer.

7. The interest-driven business intelligence system of claim 3, wherein the intermediate processing layer is configured to generate data warehouse requests.

8. The interest-driven business intelligence system of claim 7, wherein the data warehouse requests comprise MapReduce operations.

9. The interest-driven business intelligence system of claim 1, wherein the intermediate processing layer is implemented utilizing a system selected from a distributed computing system, a database management system, a NoSQL database system, or any combination thereof.

10. The interest-driven business intelligence system of claim 1, further comprising an interest-driven data visualization system configured to:
  receive metadata describing the raw data from the intermediate processing layer; and
  generate a user interface enabling user exploration of the metadata to define at least one report specification, wherein the user exploration relates to selection of additional reporting data based on the metadata.

11. The interest-driven business intelligence system of claim 10, wherein the interest-driven data visualization system is configured to display an indication based upon interactive exploration of the at least one report.

12. The interest-driven business intelligence system of claim 1, wherein the compiling of the interest-driven pipeline further comprises generating ETL processing jobs to generate aggregate data from event-oriented data by:
  identifying at least one dimension within a piece of event-oriented data;
  obtaining raw data corresponding to the identified at least one dimension;
  applying transformations to the obtained raw data based on the metadata describing the obtained raw data;
  generating aggregate data based on the transformed data; and
  storing the aggregate data in the data mart.

13. The interest-driven business intelligence system of claim 1, wherein the compiling of the interest-driven pipeline further comprises generating ETL processing jobs to generate event-oriented data from aggregate data by:
  identifying at least one dimension within a piece of aggregate data;
  obtaining raw data corresponding to the identified at least one dimension;
  filtering the obtained raw data based on the metadata describing the obtained raw data;
  determining ordering data based on the metadata describing the obtained raw data;
  aligning the filtered obtained raw data based on the ordering data;
  generating event-oriented data based on the aligned data; and
  storing the event-oriented data in the data mart.

14. The interest-driven business intelligence system of claim 1, wherein the data mart is contained within the intermediate processing layer.

15. The interest-driven business intelligence system of claim 1, wherein the ordering data comprises at least one dimension identified in the metadata describing the raw data.

16. The interest-driven business intelligence system of claim 15, wherein the aligning of the filtered raw data based on the ordering data comprises sorting the event-oriented data according to facts associated with the ordering data in each piece of event-oriented data.

17. The interest-driven business intelligence system of claim 16, wherein:
  aligning the filtered raw data based on the ordering data further comprises mapping at least two dimensions within the filtered raw data to a common set of data; and
  the common set of data is based on the ordering data.

18. The interest-driven business intelligence system of claim 1, wherein the ordering data comprises time data.

19. A method for creating a report utilizing an interest-driven business intelligence system, comprising:
  storing raw data in raw data storage using an interest-driven business intelligence system, wherein the raw data comprises unstructured data, wherein the raw data is provided by various data sources, the various data sources including a first data source and a second data source;

generating metadata describing the raw data using the interest-driven business intelligence system;

receiving report definitions generated utilizing the metadata describing the raw data using the interest-driven business intelligence system;

automatically generating reporting data requirements derived from report definitions using the interest-driven business intelligence system;

automatically compiling an interest-driven data pipeline that is part of the interest-driven business intelligence system using the reporting data requirements and the raw data, comprising:

generating ETL processing jobs to generate aggregate data from event-oriented data by:

identifying at least one dimension within a piece of event-oriented data using the interest-driven business intelligence system;

obtaining raw data corresponding to the identified at least one dimension using the interest-driven business intelligence system;

applying transformations to the obtained raw data based on the metadata describing the obtained raw data to generate the aggregate data using the interest-driven business intelligence system, wherein the aggregate data includes clicks and messages, wherein the clicks includes page ID, session ID, user ID, address ID, or any combination thereof, and wherein the messages includes message ID; and storing the aggregate data using the interest-driven business intelligence system;

obtaining event-oriented data from the interest-driven data pipeline based on the generated reporting data requirements using the interest-driven business intelligence system, wherein the event-oriented data comprises a set of dimensions and the event-oriented data is ordered based on at least one dimension in the set of dimensions;

adjusting the event-oriented data to account for timing differences between the various data sources, comprising:

converting first event-oriented data associated with the first data source and second event-oriented data associated with the second data source to a coordinated universal time (UTC) to shift the event-oriented data to a common time base;

generating reporting data from the reporting data requirements using the interest-driven data pipeline, wherein the reporting data is based on a portion of the event-oriented data and a portion of the aggregate data;

identifying trends across multiple dimensions within the reporting data; and storing the generated reporting data in a data mart within the interest-driven business intelligence system.

20. The method of claim 19, wherein the generating of the ETL processing jobs to generate aggregate data from the raw data further comprises:

filtering the raw data based on the metadata describing the raw data using the interest-driven business intelligence system;

applying transformations to the raw data based on the metadata describing the raw data to generate the aggregate data using the interest-driven business intelligence system; and storing the aggregate data using the interest-driven business intelligence system.

21. The method of claim 19, wherein the compiling of the interest-driven pipeline further comprises generating ETL processing jobs to generate event-oriented data from aggregate data by:

identifying at least one dimension within a piece of aggregate data using the interest-driven business intelligence system;

obtaining raw data corresponding to the identified at least one dimension using the interest-driven business intelligence system;

filtering the obtained raw data based on the metadata describing the obtained raw data using the interest-driven business intelligence system;

determining ordering data based on the metadata describing the obtained raw data using the interest-driven business intelligence system;

aligning the filtered obtained raw data based on the ordering data to generate event-oriented data using the interest-driven business intelligence system; and storing the event-oriented data using the interest-driven business intelligence system.

22. The method of claim 21, wherein the ordering data comprises time data.

* * * * *